March 25, 1930.　　　　G. TASMAN　　　　1,751,771
AUTOMOBILE BODY
Original Filed Sept. 2, 1926　　2 Sheets-Sheet 1
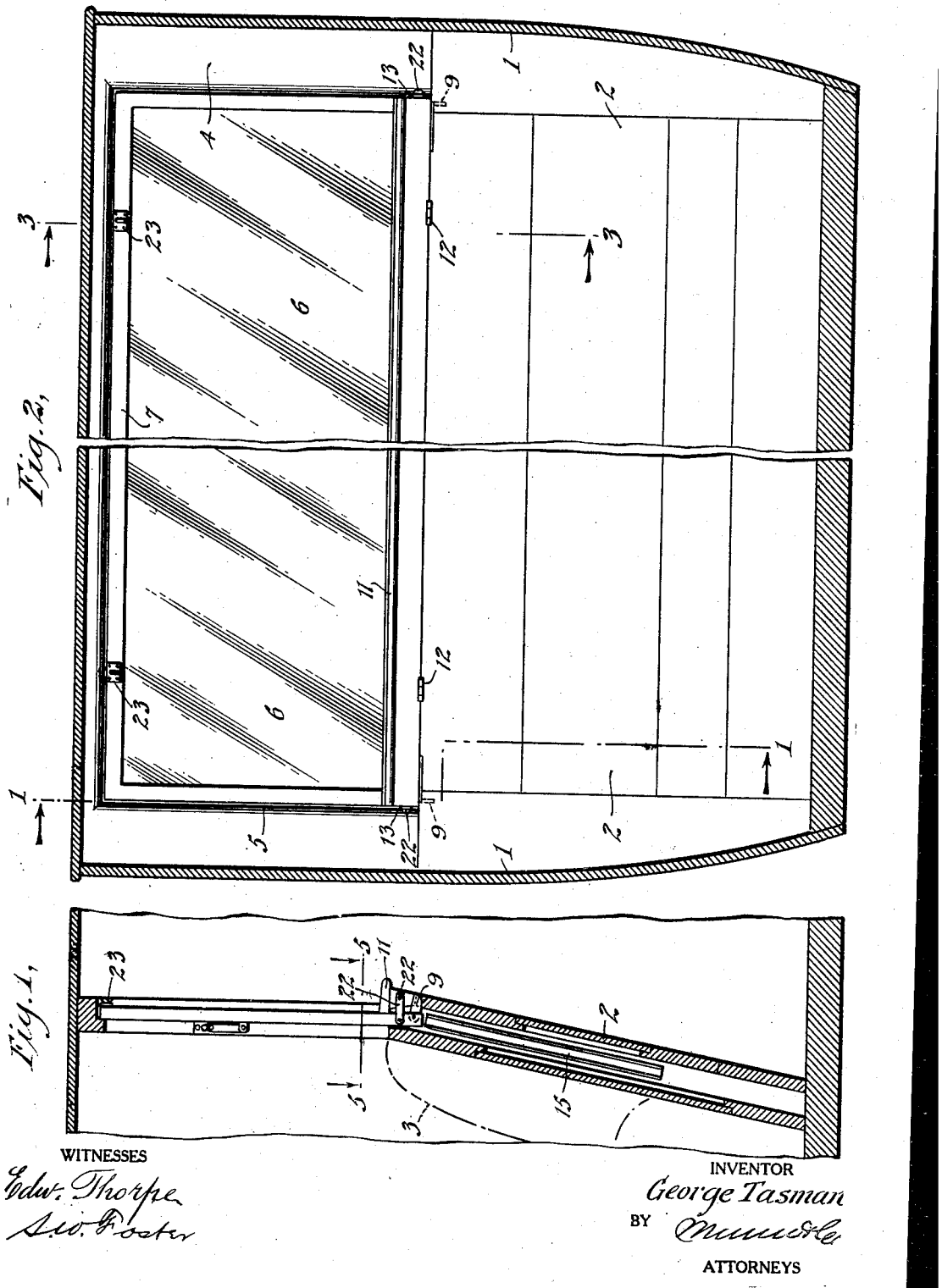
WITNESSES
Edw. Thorpe
S.W. Foster
INVENTOR
George Tasman
BY
ATTORNEYS March 25, 1930. G. TASMAN 1,751,771
AUTOMOBILE BODY
Original Filed Sept. 2, 1926   2 Sheets-Sheet 2
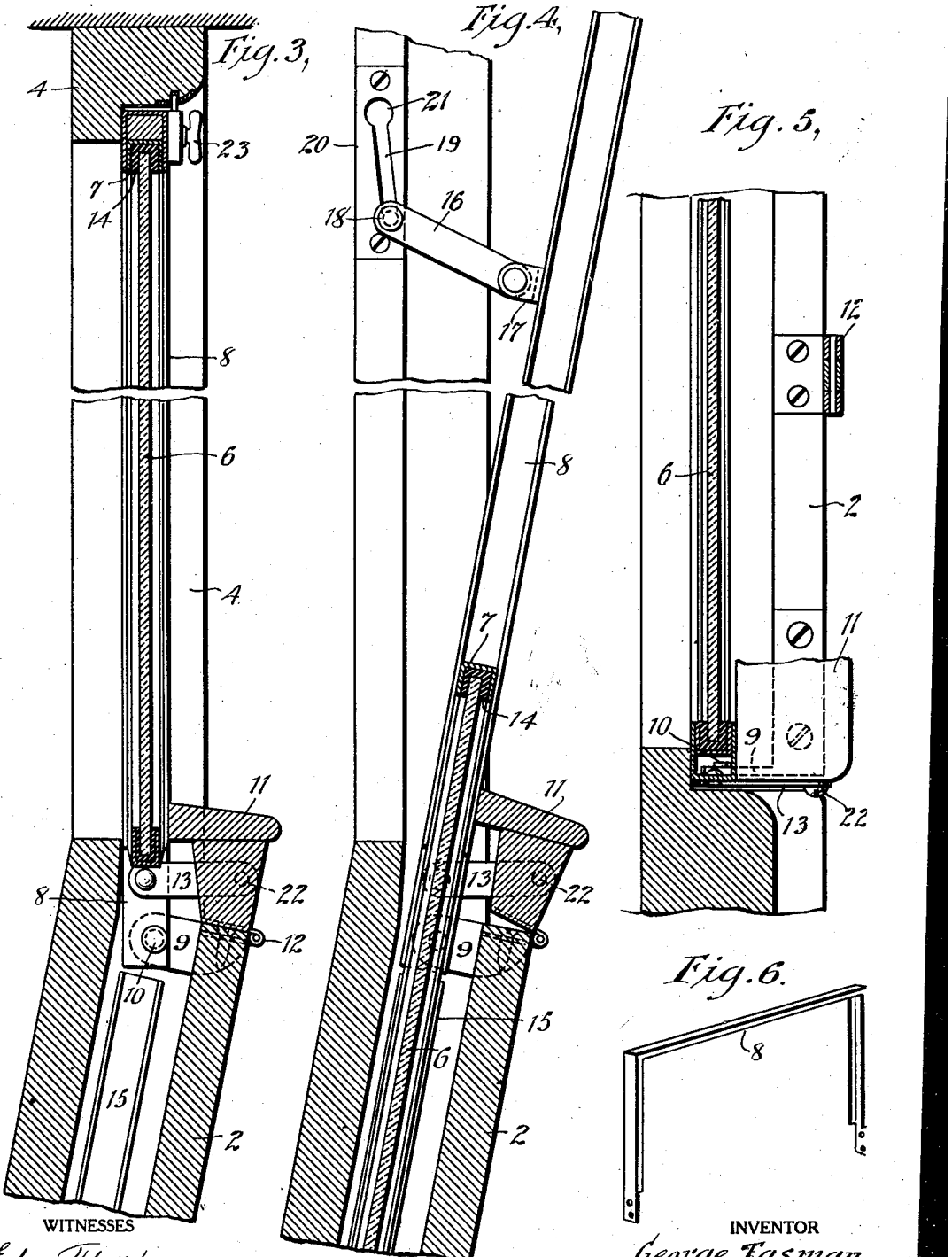
INVENTOR
George Tasman Patented Mar. 25, 1930

1,751,771

UNITED STATES PATENT OFFICE

GEORGE TASMAN, OF NEW YORK, N. Y., ASSIGNOR TO LOCKE & CO., OF NEW YORK, N. Y., A CORPORATION OF NEW YORK

AUTOMOBILE BODY

Application filed September 2, 1926, Serial No. 133,248. Renewed February 8, 1929.

This invention relates to automobile bodies and more particularly to a window construction which is slidable within a pocket within the wall. An object of the invention is to provide a device of the character described in which a window may be concealed within an inclined wall in a manner to permit it to be raised above the wall and to rest at an angle thereto. It may, for example, be used where it is desired to separate the front seat from the tonneau of an automobile. In such an instance the partition comprising the back of the front seat may be inclined forwardly from its upper portion to its lower portion to give additional footing space in the body of the car. In accordance with this invention it may be provided with an improved mounting for slidingly receiving a window which mounting nevertheless permits the window when raised above the partition to lie in a predetermined plane at an angle to the partition and yet nevertheless slide freely in and out of the inclined partition when desired.

It is frequently desirable in a car to have the window portion of the body at an angle to the lower portion particularly where the window is used as a portion of the partition as above referred to. In the latter instance, for example, it is desirable to use as much of the space beneath the front seat as is convenient to give foot room to the passengers in the tonneau but it is also desirable that the glass portion of the partition shall be substantially vertical. With this invention I secure all of the advantages of an inclined partition in the increased foot room provided and yet do not destroy or mar the appearance of the body. Because the invention offers particular advantages when applied to the partition referred to I have chosen that embodiment for illustration.

With these and other objects in view, the invention consists in certain novel features of construction and combinations and arrangments of parts which will be more fully hereinafter described and pointed out in the claims.

In the accompanying drawings—

Figure 1 is a view in longitudinal section of the car body, the section being taken on the line 1—1 of Figure 2;

Figure 2 is a view taken transversely through the body of the car looking forwardly;

Figure 3 is a view in section on an enlarged scale on the line 3—3 of Figure 2;

Figure 4 is a view similar to Figure 3, showing the window partially lowered;

Figure 5 is a fragmentary view in section on an enlarged scale on the line 5—5 of Figure 1;

Figure 6 is a perspective view on a reduced scale of the window frame.

The device comprises in general a guide frame within a pocket in a hollow wall adapted slidingly to receive the window and to retain the same against rattling and means extending above the partition which may normally support the window at an angle to the partition but which is movable to a position in alinement with the guides. As specifically illustrated, the numeral 1 represents an automobile body having a hollow partition 2 which extends upwardly as high as desired and is located back of the front seat 3 of the automobile. This partition extends forwardly from its upper to its lower end so as to give ample foot room in the rear portion of the body. 4 represents a perpendicularly disposed extension of this partition 2 which is fixed in the body of the car and at an angle to the partition 2, as clearly indicated in Figure 1. This extension 4 has an opening 5 therein of a desired size and this opening 5 is adapted to be closed by a window 6, the latter being strengthened by a metal border 7 and mounted to slide in a window frame 8.

The frame 8, illustrated in perspective in Figure 6, is of channel iron and is of general inverted U-shape, the side flanges of the channels preferably terminating short of the lower extremities of the frame for a purpose which will more fully hereinafter appear. Angle brackets 9 are secured to the rear wall of the partition 2, project into the hollow partition and are pivotally connected to the lower extremities of the frame 8 by rivets or other connecting devices 10.

11 represents an ornamental sill which is connected by hinges 12 to the rear wall of the hollow partition 2 at the top thereof, and links 13 are pivotally connected to the sill 11 and to the frame 8 so that when the frame is swung on the pivots 10 the links 13 will compel the sill 11 to move on its hinges to the position indicated in Figure 4.

The border member 7 of the window 6 constitutes a channel which is suitably packed around the window, as shown at 14, and this border is adapted to fit and slide in the frame 8. The lower member or bar of this border 7 is preferably slightly narrower than the other portions of the border so as to insure the window finding its way into channel guides 15 secured in the hollow partition 2. These guides 15 are located in the ends of the partition and are adapted to support the window when the latter is lowered.

To limit and guide the movement of the window frame 8 I provide links 16 which are pivotally connected to brackets 17 on the window frame and have headed pins 18 mounted to move in slots 19 in plates 20 fixed to the extension 4. The upper ends of the slots 19 are enlarged, as shown at 21, to allow the pins 18 to be removed and be entered in the slots in removing or assembling the window frame.

The links 13 above referred to are connected to the sill 11 by screws 22 so that when these screws are removed the sill can be thrown back and access can be had to the several parts to couple or uncouple them in assembling or taking the window construction apart.

Suitable catches 23 are provided at the upper portion of the frame 8 to engage a fixed part of the car body, this fixed part constituting a portion of the extension 4 above referred to. These catches also function as handles to facilitate the manipulation of the mechanism.

The operation is as follows:

Figures 1, 2 and 3 illustrate the window in its raised or closed position where it will be noted that the window is perpendicular and at an angle to the hollow partition 2. When it is desired to lower the window the operator grasps the catches 23 and unlocks the same and draws the upper end of the window frame 8 rearwardly to a position in alinement with the guides 15 in the hollow partition 2. This movement of the window frame is limited by the links 16, which latter insure a proper alinement of the window guides when the window frame is drawn to its rearward position. This rearward movement of the window frame causes the sill 11 to swing on its hinges, as indicated clearly in Figure 4, and when the parts are in this position the window can be moved downwardly from the frame 8 into the guides 15 and be enclosed in the hollow partition. The window frame can then be returned to its normal vertical position and locked by the catches 23.

I have not attempted to illustrate any particular means for raising the window out of the hollow partition as I may use any standard or other means for this purpose and such means form no part of the present invention.

When the window is drawn upwardly to its highest point the window frame can be locked and the partition will form an effective closure between the front and rear portions of the car body, as clearly indicated in the drawings.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the general and specific features of the invention herein described, and all statements of the scope of the invention which, as a matter of language, might be said to fall therebetween.

I claim:

1. A car body having a hollow transverse partition inclined rearwardly from its lower to its upper end, perpendicular uprights extending upwardly from the partition, a window guide frame pivotally connected to the partition at a point adjacent to the top of the partition and adapted to be swung from a position in alinement with the hollow partition and to a perpendicular position between the uprights, and a sliding sash movable in said guide frame.

2. A car body having a hollow transverse partition having a pocket substantially the thickness of a window inclined rearwardly from its lower to its upper end, perpendicular uprights extending upwardly from the partition, a window guide frame pivotally connected to the partition and adapted to be swung from a position in alinement with the hollow partition and to a perpendicular position between the uprights, a sliding sash movable in said guide frame, and links pivotally connected to the frame and having sliding and pivotal connection to the uprights whereby said links limit the movement of the guide frame.

3. A car body having a hollow transverse partition having a pocket substantially the thickness of a window inclined rearwardly from its lower to its upper end, perpendicular uprights extending upwardly from the partition, a window guide frame pivotally connected to the partition and adapted to be swung from a position in alinement with the hollow partition and to a perpendicular position between the uprights, a sliding sash movable in said guide frame, means for holding the frame in perpendicular position between the uprights, and means limiting the pivotal movement of the guide frame from a position in alinement with the hollow partition to a position between the uprights.

4. A car body having a hollow transverse partition having a pocket substantially the thickness of a window inclined rearwardly from its lower to its upper end, perpendicular uprights extending upwardly from the partition, a window guide frame pivotally connected to the partition and adapted to be swung from a position in alinement with the hollow partition and to a perpendicular position between the uprights, a sliding sash movable in said guide frame, links pivotally connected to the frame and having sliding and pivotal connection to the uprights whereby said links limit the movement of the guide frame, means for holding the frame in perpendicular position between the uprights, and means for covering the sash when the latter is in the hollow partition.

5. A device of the character described comprising in combination a hollow wall, stationary guide ways within said wall for slidingly receiving a window, a support for holding the window at an angle to said guide ways when in closed position and a frame for slidingly receiving said window, said frame being pivoted to said wall and movable from a position in alinement with said guides to said closed position.

6. A device of the character described comprising in combination a hollow wall, guide ways within said wall for slidingly receiving a window, a support for holding the window at an angle to said guide ways when in closed position and a frame for slidingly receiving said window movable from a position in alinement with said guides to said closed position and means for releasably retaining the frame work in both positions.

7. A device of the character described comprising in combination a hollow wall, guide ways within said wall for slidingly receiving a window, a support for holding the window at an angle to said guide ways when in closed position and a frame for slidingly receiving said window, said frame being pivoted to said wall and movable from a position in alinement with said guides to said closed position and a window sill articulated to move with said frame work.

8. A device of the character described comprising in combination a wall having a pocket substantially the thickness of a window and having guide ways and inclined to the vertical for slidingly receiving a window, a support above said wall for holding a window at an angle to said guideways when in closed position and a frame for slidingly receiving said window frame being pivoted at its lower end to said wall and movable from a position in alinement with said guide ways to said closed position.

GEORGE TASMAN.